United States Patent [19]

Einhaus

[11] Patent Number: 4,899,330
[45] Date of Patent: Feb. 6, 1990

[54] ADAPTOR FOR MINI CD

[75] Inventor: Hermanus F. Einhaus, Ham, Belgium

[73] Assignee: U.S. Philips Corporation, New York, N.Y.

[21] Appl. No.: 239,809

[22] Filed: Sep. 2, 1988

[30] Foreign Application Priority Data

Sep. 16, 1987 [NL] Netherlands .......................... 8702202

[51] Int. Cl.[4] ............................................. G11B 23/00
[52] U.S. Cl. ..................................... 369/289; 369/292
[58] Field of Search .............. 369/270, 271, 272, 277, 369/289, 290, 291, 292; 360/133

[56] References Cited

U.S. PATENT DOCUMENTS

| | | | |
|---|---|---|---|
| 1,683,440 | 9/1928 | Bodwell et al. | 369/291 |
| 2,285,139 | 6/1942 | Andres | 369/289 |
| 2,646,284 | 7/1953 | Wengayden | 369/267 |
| 3,801,110 | 4/1974 | Licitis | 369/277 |
| 4,148,491 | 4/1979 | Stark et al. | 369/289 |

Primary Examiner—Steven L. Stephan

[57] ABSTRACT

Adaptor the periphery of an optical disc has an annular body (3) having a center hole (7) for receiving the disc and an annular adhesive strip 5 for affixing the disc placed in the center hole.

8 Claims, 1 Drawing Sheet

ADAPTOR FOR MINI CD

BACKGROUND OF THE INVENTION

The invention relates to an adaptor which can affixed to a rotatable disc record to be inscribed and/or read and having a specific outer diameter, in particular an optical disc. The adaptor has an annular body having an inner rim which bounds a center hole in which the disc record can be placed.

Such an adaptor is known from U.S. Pat. No. 2,285,139 (herewith incorporated by reference) of 1942 and intended to give gramophone records of different size the same dimensions to enable the records to be played on one and the same automatic record player. The known adaptor comprises a first ring provided with an internal annular recess adaped to receive a gramophone record, and a second ring which is attached to the first ring partly before and partly after insertion of the gramophone record.

U.S. Pat. No. 2,646,284 (herewith incorporated by reference) describes an intricate adaptor for gramophone records, which comprises a metal disc formed with a small centre hole, a first plastic ring with a large opening adapted to receive a gramophone record, a soft ring interposed between the metal disc and the plastic ring, and a second plastic ring intended to retain the gramophone record in the large opening.

It is further known to use a central adaptor to enable gramophone records of different types to be played on the same record player. Some currently commercially available gramophone records, namely the long-play records, have a small center hole for co-operation with a thin rotatable spindle of the record player and other records, referred to as the singles, are provided with a large center hole. By mounting a disc-shaped adaptor having a small center hole in the large center hole of the last-mentioned records these records are adapted to co-operate with the thin rotatable spindle of the record player.

Until recently only one type of optical disc carrying audio information was available, namely the Compact Disc (CD), so that such problems did not occur in the field of optical discs. However, recently a smaller version of the Compact Disc has been put on the market, which version has a smaller outer diameter than the CD. The new type of Compact Disc, also referred to as "CD single" or "mini CD", has an outer diameter of 80 mm. The original Compact Disc has an outer diameter of 120 mm. A problem arising by the introduction of the CD single is that the smaller optical disc cannot readily co-operate with all optical apparatuses intended for the original Compact Disc. For example, the disc-loading mechanism of existing optical audio equipment is not constructed to accept such small discs. Moreover, the small optical discs cannot readily be accommodated in the known storage cases and trays.

On account of their nature and construction the adaptors known from the cited U.S. Patents are not suitable for use in conjunction with the small vulnerable CD-singles.

SUMMARY OF THE INVENTION

The adaptor has means for affixing the disc placed in the central opening to the annular body. The invention in a surprisingly very simple way enables discs, in particular optical discs, of different outer diameters to be adapted for use in one and the same recording and/or playback apparatus. The adaptor in accordance with the invention is intended in particular for use in conjunction with the CD single. If the adaptor has an outer diameter of 120 mm an assembly of a CD single and adaptor can be obtained having the same dimensions as the well-known CD, so that the CD single is adapted to co-operate with the currently marketed CD apparatuses.

A preferred embodiment of the adaptor includes a supporting surface for axially positioning the disc placed in the center hole and an adhesive layer provided on the supporting surface.

Such an adaptor can readily be attached to a disc by a user. The presence of the supporting surface ensures that the disc, after insertion into the center hole of the adaptor, is in fact automatically located in the correct position in the adaptor.

A further preferred embodiment, which can be manufactured very cheaply, has an annular adhesive tape affixed to a radial surface of the body. For practical reasons the adhesive tape is suitably provided with a detachable cover strip. If a type of adhesive is used which allows the adaptor to be affixed to several times to a disc, the cover strip may be replaced after removal of the disc from the adaptor to prevent the adhesive from drying out.

The annular body may be provided with information on one side. The information may be provided at the factory and may include instructions relating to the use of the adaptor. The material for the annular body is preferably plastic, but other suitable materials such as resin-bonded paper may also be used.

The invention further relates to an assembly of an optical disc record and an adaptor in accordance with the invention. The assembly has a thickness which is substantially equal to the thickness of the relevant disc.

Figure 1:
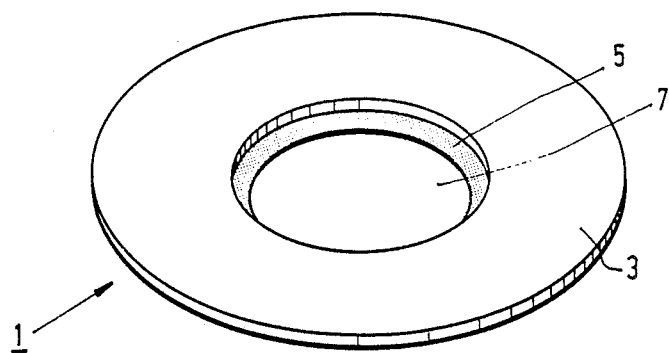
FIG. 1 is a perspective view of the adaptor.
Figure 3:
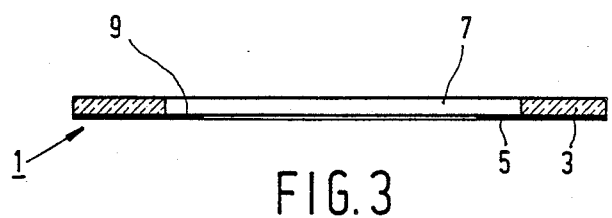
FIG. 3 is a cross-sectional view of the adaptor shown in FIG. 1.

The adaptor in accordance with the invention shown in FIGS. 1 and 3 comprises an annular body which is injection-moulded from a plastic material, for example acryl butyl styrene, and an annular adhesive tape 5 affixed to the body 3, which tape partly covers the centre hole 7 formed in the body 3. The part of the adhesive tape 5 which partly covers the centre hole 7 is provided with a thin protective paper layer 9 at the side facing the centre hole, which layer must be removed before the adaptor is used. The present adaptor 1 is intended in particular for co-operation with a CD single.

Figure 2:
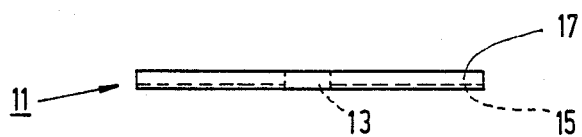
FIG. 2 is a side view of a CD single.
Figure 4:
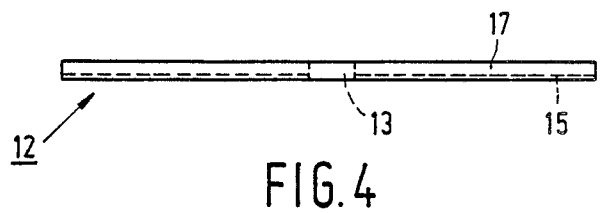
FIG. 4 is a side view of a CD.

The CD single 11, shown diagrammatically in FIG. 2, is an optically readable digital audio disc having a small outer diameter, namely 80 mm. The dimensions of the centre hole 13 of the disc, the thickness of the disc and the construction of the disc are similar to those of the well-known Compact Disc (CD) 12, which for comparison is shown diagrammatically in FIG. 4. The CD single 11, like the CD, has an information surface 15 in which information is arranged in a spiral track comprising a multitude of optically detectable information areas alternating with intermediate areas. The information surface 15 is radiation-reflecting and is situated at such a location in the audio disc that a read beam has to traverse a transparent substrate 17 of the disc before it can reach the information surface.

The present adaptor 1 has an outer diameter corresponding to the outer diameter of the CD 12, namely 120 mm, and an inner diameter which is just large enough to allow the CD single 11 to be fitted in the centre hole 7. When the small audio disc 11 is inserted into the centre hole 7 the adhesive tape 5 acts as an axial positioning means for the disc, so that after adhesion to the adhesive tape 5 the disc is positioned correctly relative to the annular body 5. The annular body 5 suitably has a thickness equal to the thickness of the optical disc 11, so that the assembly of the adaptor 1 and the CD single 11 has dimensions which substantially correspond to the dimensions of the normal CD 12. It is to be noted that it is possible to provide one side or both sides of the adaptor with information, if desired this may be optical information.

What is claimed is:

1. An adaptor comprising:
   an annular body having an inner rim which bounds a centre hole in which said disc record can be placed, which annular body has an outer diameter which is substantially larger than the outer diameter of said optical disc;
   an annular sheet of material substantially thinner than said annular body, said annular sheet affixed to a surface of said annular body and having an inner rim which bounds a center hole smaller than the center hole in said annular body; and
   an a layer of adhesive on the portion of said annular sheet of material that is accessible through the center hole of said annular body.

2. An adaptor as in claim 1 wherein said annular sheet comprises an annular adhesive tape affixed to a radial surface of said body.

3. An adaptor as in claim 2 wherein the adhesive tape is provided with a detachable cover strip covering only the portion of the adhesive tape accessible through said center hole of said annular body.

4. An adaptor as in claim 1 wherein the annular body is injection-molded plastic.

5. An adaptor as in claim 1 wherein the annular body is provided with information on at least one side.

6. An adaptor as in claim 1 wherein the inner diameter of the annular body is 80 mm and the outer diameter is 120 mm.

7. An assembly comprising an optical disc to be inscribed and/or read and an adaptor as claimed in claim 1 wherein the assembly has a thickness which is substantially equal to the thickness of the relevant disc.

8. An adaptor as claimed in claim 5 in which said information is optical information.

* * * * *